(12) United States Patent
Meyer

(10) Patent No.: US 7,218,471 B2
(45) Date of Patent: May 15, 2007

(54) SELF-SERVO WRITING USING RECORDING HEAD MICROPOSITIONER

(76) Inventor: Dallas W. Meyer, 4130 Sugar Maple Dr., Danville, CA (US) 94506

( * ) Notice: Subject to any disclaimer, the term of this patent is extended or adjusted under 35 U.S.C. 154(b) by 539 days.

(21) Appl. No.: 10/728,561

(22) Filed: Dec. 5, 2003

(65) Prior Publication Data

US 2004/0160696 A1 Aug. 19, 2004

Related U.S. Application Data

(60) Provisional application No. 60/431,648, filed on Dec. 5, 2002.

(51) Int. Cl.
*G11B 21/02* (2006.01)

(52) U.S. Cl. ...................................................... 360/75

(58) Field of Classification Search ..................... None
See application file for complete search history.

(56) References Cited

U.S. PATENT DOCUMENTS

| | | | |
|---|---|---|---|
| 5,060,210 A | 10/1991 | Fennema et al. | 369/32 |
| 5,521,778 A | 5/1996 | Boutaghou et al. | 360/106 |
| 6,078,468 A | 6/2000 | Fiske | 360/104 |
| 6,101,058 A | 8/2000 | Morris | 360/69 |
| 6,262,868 B1 | 7/2001 | Arya et al. | 360/290 |
| 6,414,827 B1 | 7/2002 | Young et al. | 360/678.09 |
| 6,421,211 B1 | 7/2002 | Hawwa et al. | 360/294.4 |
| 6,452,755 B2 | 9/2002 | Bonin | |
| 6,469,859 B1 | 10/2002 | Chainer et al. | |
| 6,490,118 B1 | 12/2002 | Ell et al. | 360/77.04 |
| 6,493,177 B1 | 12/2002 | Ell et al. | 360/78.05 |
| 6,501,623 B1 | 12/2002 | Sassolini et al. | |

(Continued)

OTHER PUBLICATIONS

Co-pending U.S. Patent Application to Dallas W. Meyer, U.S. Appl. No. 10/342,920, filed Jan. 13, 2003 (54 pages), and 17 sheets of accompanying drawings. Note: In an Office Action mailed in this case on Jun. 14, 2004, claims 1, 4, 12, 13, 24, and 31 were rejected under 35 U.S.C. § 102(e) by U.S. Patent No. 6,600,634 to Kim, et al., claims 1-3, 7, 10, 12, 13, 16, 17, 24, 25, 29, 31-33, and 35-38 were rejected under 35 U.S.C. § 102(e) by U.S. Patent No. 6,6611,399 to Mei, et al, and claims 14, 15 were rejected under 35 U.S.C. § 103(a) by Mei.

(Continued)

*Primary Examiner*—K. Wong
(74) *Attorney, Agent, or Firm*—Workman Nydegger

(57) ABSTRACT

Servo tracks are written onto different disk surfaces using multiple recording heads within a disk drive without requiring a servo writing machine or clean room conditions. Microactuators in the reference heads in the disk drive are capable of independent motion with respect to one another, which allows the servo tracks to be written to the disk surfaces. The process begins as the recording heads are biased against a crash stop, and then moved to an adjacent track. One of the heads writes a reference track at this adjacent track position when a microactuator of the head is centered. This reference head then follows the reference track with its microactuator centered, while the other recording heads move in the radial direction to write servo information on their respective tracks. Reference tracks are then successively used to write the servo information as the recording heads move in a direction away from the crash stop.

48 Claims, 5 Drawing Sheets

U.S. PATENT DOCUMENTS

| | | | |
|---|---|---|---|
| 6,519,107 B1 * | 2/2003 | Ehrlich et al. | 360/75 |
| 6,522,494 B1 * | 2/2003 | Magee | 360/75 |
| 6,535,360 B1 | 3/2003 | Kim et al. | |
| 6,542,281 B2 | 4/2003 | Feldman et al. | |
| 6,545,970 B2 | 4/2003 | Durnin et al. | |
| 6,547,975 B1 | 4/2003 | Kobrin | |
| 6,556,380 B2 | 4/2003 | Bunch et al. | |
| 6,563,665 B1 | 5/2003 | Ell | 360/78.05 |
| 6,594,119 B1 | 7/2003 | Koshikawa et al. | 360/294.3 |
| 6,600,619 B1 | 7/2003 | Morris et al. | 360/75 |
| 6,600,634 B1 | 7/2003 | Kim et al. | 360/294.5 |
| 6,611,399 B1 | 8/2003 | Mei et al. | 360/234.7 |
| 6,633,451 B1 | 10/2003 | Chainer et al. | |
| 6,724,558 B2 * | 4/2004 | Bryant et al. | 360/75 |
| 6,747,836 B2 | 6/2004 | Stevens et al. | 360/78.05 |
| 6,768,610 B1 | 7/2004 | Morris et al. | 360/78.07 |
| 6,785,086 B1 * | 8/2004 | Bonin et al. | 360/78.05 |
| 2003/0093894 A1 | 5/2003 | Dugas et al. | |
| 2003/0161061 A1 | 8/2003 | Lamberts | |
| 2003/0197969 A1 | 10/2003 | Szita et al. | |

OTHER PUBLICATIONS

Co-pending U.S. Patent Application to Dallas W. Meyer, U.S. Appl. No. 10/342,615, filed Jan. 13, 2003 (43 pages), and 7 sheets of accompanying drawings. Note: In an Office Action mailed in this case on Aug. 25, 2004, claims 1-34 were rejected under 35 U.S.C. § 102(e) by U.S. Patent No. 6,768,610 to Morris, et al., and claims 35-42 were rejected under 35 U.S.C. § 103(a) by Morris, et al. in view of U.S. Patent No. 6,078,468 to Fiske.

Co-pending U.S. Patent Application to Dallas W. Meyer, U.S. Appl. No. 10/775,406, filed Feb. 9, 2004.

Co-pending U.S. Patent Application to Dallas W. Meyer, U.S. Appl. No. 10/794,482, filed Mar. 5, 2004.

Co-pending U.S. Patent Application to Dallas W. Meyer, U.S. Appl. No. 10/818,641, filed Apr. 5, 2004.

Co-pending U.S. Patent Application to Dallas W. Meyer, U.S. Appl. No. 10/900,713, filed Jul. 27, 2004.

* cited by examiner

SELF-SERVO WRITING USING RECORDING HEAD MICROPOSITIONER

CROSS-REFERENCE TO RELATED APPLICATIONS

This application claims the benefit of U.S. Provisional Patent Application Ser. No. 60/431,648, filed Dec. 5, 2002, entitled "Integrated Recording Head Micropositioner and Use Thereof for Self-Servo Writing," which is incorporated herein by reference.

BACKGROUND OF THE INVENTION

1. The Field of the Invention

The present invention relates to data storage on rotating magnetic storage devices. More particularly, the present invention relates to using micropositioners for positioning recording heads of a disk drive to create servo data on a disk for use in tracking during operation of the disk drive.

2. Background and Related Art

Hard disk drives are an important data storage medium for computers and other data processing systems. Magnetic hard disk drives have significantly improved in size, performance and cost due to many technology innovations. The prevalent trend in hard disk design is to make smaller hard disks with increasing track density, which is increasing demands in the servo control, i.e., accurate locating and following of tracks that hold the data.

FIG. 1 illustrates a conventional hard disk drive 100, which includes a single disk 120 and a single head gimble assembly (HGA) 140 with a macroactuator 160 and a slider, or recording head 180. In operation, a transducer positioned on the recording head 180 reads data that is magnetically encoded on the surface of the disk 120 or writes data to the surface of the disk 120. In order to access the appropriate sectors on the disk 120, the macroactuator 160 uses a closed-loop feedback or servo process to detect the position of the recording head 180 and adjust the position as needed.

Most conventional disk drives 100 have multiple recording heads 180 and can include multiple disks 120 in a disk stack. Most conventional hard drives 100, however, read and write data using one recording head 180 at a time, on various surfaces within the disk stack, rather than using multiple recording heads simultaneously, due to several physical limitations. The inability to use more than one recording head 180 at a time is a factor that has significantly limited improvements in the data rates of disk drives.

FIG. 2 illustrates a disk drive 200 with a disk stack that includes two disk platters 270a, 270b. Each disk 270a, 270b includes multiple tracks 210a, 210b, which are concentric sets of magnetic bits on the disk. Each track 210a, 210b is divided into sectors 210c, which are typically marked with an identification number within a sector header and are usually 512 bytes in size. A group of tracks having the same radius, such as tracks 210a and 210b, make up a cylinder within the disk drive. Tracks 210a and 210b can also be located on opposing surfaces of disk platters 270a and 270b. Accordingly, disk drive 200 has sliders or recording heads 220a, 220b, 220c, 220d on both sides of the disks 270a and 270b.

Sliders 220a, 220b, 220c, 220d are attached to arms 260a, 260b, 260c, 260d, respectively, which are rotated by course actuator, or macroactuator, 240 about an axis of rotation 280. Typically, actuator 240 is a voice coil actuator that utilizes a closed-loop feedback system (i.e., servo system) to dynamically position the heads 220a, 220b, 220c, 220d directly over the data tracks 210a and 210b on both sides of disks 270a and 270b. Feedback is provided by data bits known as servo wedges 250 that are located between sectors of various tracks 210a, 210b. When in operation, spindle 230 of disk drive 200 rotates disks 270a, 270b while macroactuator 240 moves heads 220a, 220b, 220c, 220d in a radial direction to find the appropriate track 210a, 210b at which the desired data is stored.

The hard disk drive (HDD) servo system consists essentially of two modes of operation namely, the track seeking mode and the track following mode. The track seeking mode moves the heads 220a, 220b, 220c, 220d in the radial direction from a present track to a specific destination track in a minimum time using bounded control effort. The track-following mode is to control and keep the head in the correct position in the presence of noise and other disturbances while information is being read from or written to the hard disks 270a, 270b.

FIG. 3 illustrates a magnified view of servo bit data used in assisting an actuator to keep the heads on track. As shown, data track 300 includes servo half bits 350 within a servo area 315 that is between data 305 within the track. Gray code and timing bits 320 are located just below the servo area 315, and a read-write transition 310 is located right after the servo area 315. A read head 325 is positioned into the center of the track and used as feedback to the servo system for adjusting an actuator arm as the heads move off-line. This is done through a measurement in comparison of the half bits 350 using a position error signal. Also shown in FIG. 3, when the heads are on track 330, the magnitude of the half bits on the "A" side of track 300 are equal in magnitude, within a predefined tolerance, of the half bits located on the opposite "B" side of track 300. As the head moves off-track 335, the magnitude of one side of the half bits falls below a predetermined threshold of the position error signal, and the appropriate feedback is provided to reposition the heads using the actuator arm.

To read and write data, the disk drive head must remain accurately centered on a selected track. Due to the increasing demand of higher track densities, the heads are being required to be centered on the narrow tracks within high tolerances of approximately one-millionth of an inch or less. Accordingly, the precision in writing servo data within a track is also increasing in complexity.

The process by which the tightly packaged magnetic servo bits are written onto the platter is referred to as servo writing. One conventional method for performing servo writing uses a high precision servo writing machine during the manufacturing of the device. The servo writing machine is an expensive device that is used to control the actuator during this process, as the servo writing progresses across the disk. Because the head stack is exposed through an opening in the drive, servo writing must also be done in a clean room environment with external sensors invading the head disk assembly to provide the precise angular and radial position information to write the servo patterns. Off-set servo wedges, as shown in FIG. 3, are formed in the drive by positioning the writer at half track during multiple revolutions, which requires each disk drive to be processed by the servo writing machine for a significant amount of time.

A second conventional alternative is to pre-write the servo track at the media level, prior to assembly into the drive. Issues with this approach, however, include the high capital costs of media level servo writers and the stacking tolerances during the drive assembly for multiple disk drives that require modifications to be made to the current drive architecture. In addition, neither type of the foregoing servo writing methods compensates for dynamic mechanical conditions in disk drives or in dedicated spinstands for single disk writing, such as thermal motion, drive induced vibration, spindle bearing runout, disk vibration/flutter, actuator windage, etc.

BRIEF SUMMARY OF THE INVENTION

The present invention overcomes the above-identified deficiencies and drawbacks of servo writing machines by providing a disk drive that can write servo track information without requiring an external servo writing machine to position the recording heads. The ability to write servo track information without the use of external servo writing machines is enabled by the use of a microactuator assembly, which allows the active portion of each recording head to be positioned independently at the micro-scale with respect to the other recording heads.

Theses processes and systems are used for disk drives that have multiple recording heads, each being used on a different disk surface. The process begins as the recording heads are biased against an outer (or inner) diameter crash stop, and then move to an adjacent outermost (or innermost) track. One of the recording heads writes a reference track at this outermost (or innermost) track position when the microactuator is centered. While this reference head follows the reference track with its microactuator centered, the other recording heads can move in the radial (track-offset) direction to write the servo information. Referenced tracks are then successively used to write the servo information as the recording heads move from the outer (or inner) diameter to the inner (or outer) diameter.

Other example embodiments provide for the ability to compensate for dynamic mechanical conditions or motions created within the disk drive. The motions can be separated by frequency and applied by added and/or subtracted factors for compensating for head or system motions. For example, modes related to the motor and base excitations (determined by measuring or modeling particular excitation frequencies) may be subtracted from a position error signal to force a microactuator to move opposite to the determined motion to maintain a fixed position with respect to the disk. Modes related to disk flutter, on the other hand, may be added to the position error signal forcing the microactuator to follow the disk motion.

Other embodiments provide for intermediary track positioning of the recording heads using microactuators. This allows for erasing a portion of the servo wedges in order to produce the desired half width bits in the servo wedge area, as well as a consistency check on the written tracks, looking for signal interrupts or signal overlap, in parallel with the half track erasures. A final error check may be done by comparing the signals (with proper frequency splitting and summations) generated by opposite heads, to ensure consistency in servo track linearity.

Servo writing methods using the microactuators can significantly reduce manufacturing costs. Rather than requiring the use of expensive external servo writing machines, the servo information can be created by placing newly manufactured disk drives in an acoustically quiet and mechanically stable environment and causing the disk drives to execute the self-servo writing algorithms disclosed herein.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to disk drives and associated systems that are capable of writing servo error information onto a disk that is used in a closed-loop servo system. The disk drives of the invention can include an arbitrary number of disks in a stack. Each disk can have a single recording head on a single side of the disk or can have dual recording heads, with one head on each side of the disk.

Embedded servo wedges, which define the position of the data tracks on the surface of a disk, are written to one or more surfaces of the disk without the use of an external servo writing machine. This process is enabled by the use of microactuator assemblies, which allow the active portion of each recording head to be positioned independently at the micro-scale with respect to the other recording heads. In particular, a small-scale actuator is positioned between the transducers and the coarse actuator, or macroactuator, which moves the entire head gimble assembly (HGA). The small-scale actuator adjusts the position of the traducers on each recording head with respect to the data tracks on the corresponding disk. Consequently, the transducers on the multiple recording heads can be reliably positioned simultaneously over the data tracks in a cylinder that spans multiple disks, which permits parallel read or write operations to be performed using multiple recording heads.

In general, the ability to achieve track-track motion by microactuators or other small-scale actuators that is partially independent of the motion of the other small-scale actuators allows the disk drives disclosed herein to write servo information without the use of external servo writing machines. As described herein in greater detail, the servo writing techniques have a first order component that is obtained by alternatingly using different recording heads in the disk drive as reference elements that allow the other recording heads to achieve specified off-track motion that is used to write the servo information. For example, a first recording head is held in a constant reference position while the other recording heads are offset by a specified amount to create the servo information.

In addition, as also described herein in greater detail, the servo writing techniques have a second order component that is obtained by using the microactuation to compensate for dynamic conditions in the disk stack, such as thermal motion, drive induced vibration, spindle bearing runout, disk vibration or flutter, actuator windage, etc. The reference recording head can detect such conditions or follow a reference track in spite of such conditions, which allows the other recording heads to accurately write servo information.

Figure 7A:
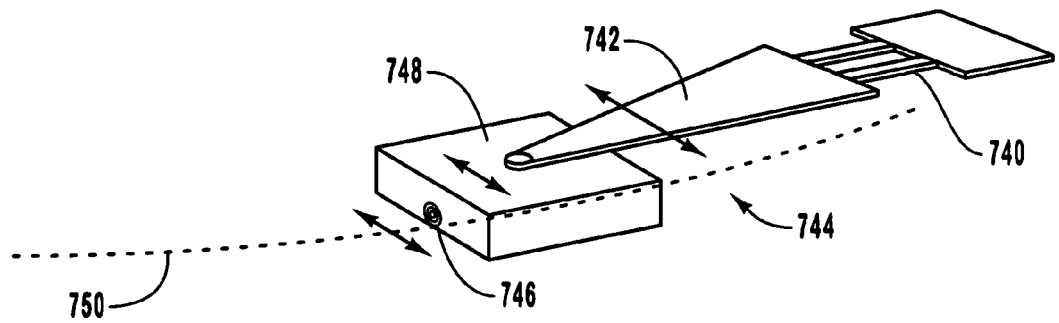
FIG. 7a illustrates a small-scale actuator that is integrated into an arm of a head gimble assembly in a disk drive.
Figure 7B:
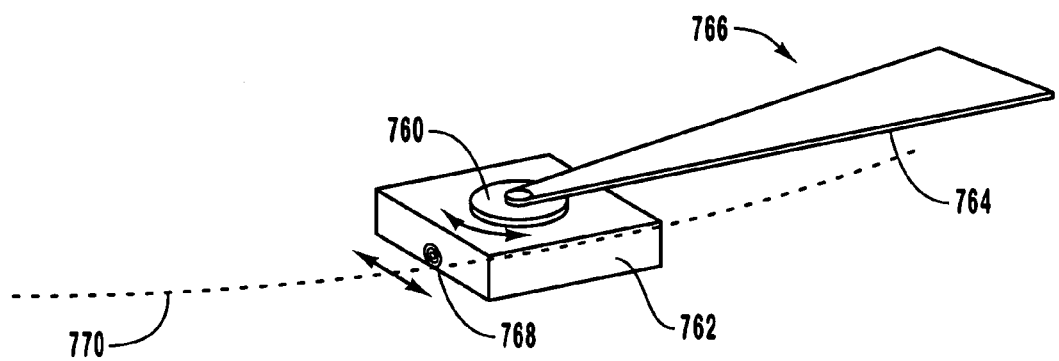
FIG. 7b depicts a small-scale actuator that rotates the recording head about the end of the arm of a head gimble assembly.
Figure 7C:
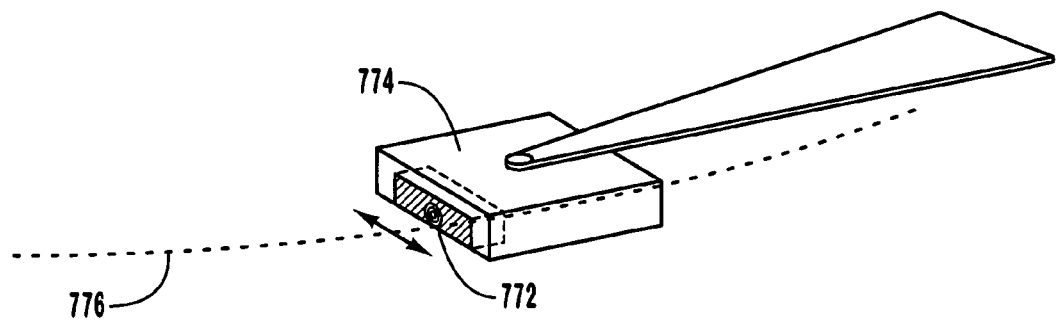
FIG. 7c illustrates a small-scale actuator that is integrated into the slider of a g head and moves the transducer with respect to the remainder of the slider.

Any of a variety of small-scale actuators can be used with the invention, examples of which are illustrated in FIGS. 7a–c. As used herein, the terms "small-scale actuator" and "microactuator" are substantially interchangeable. FIG. 7a illustrates a microactuator 740, which is a small-scale actuator integrated into the arm 742 of a HGA 744 between the macroactuator and the transducer 746. Microactuator 740 can also be referred to as a "milli-actuator", since the motion that is generated is on a scale that is intermediate with respect to the larger scale motion generated by the macroactuator and the smaller-scale motion that is generated by the small-scale actuators described below with respects to FIGS. 7b and 7c that move only the recording head or just the transducer. The microactuator 740 is capable of moving the end portion of the arm 742 and the attached recording head 748 in a direction that is substantially perpendicular to the orientation of the data track 750. Microactuator 740 may be constructed using a piezoelectrical device or another device that is capable of controlling movement of the recording head 748.

FIG. 7b depicts a microactuator 760, which is another example of the small-scale actuators that can be used according to the invention. Microactuator 760 induces rotational motion of the recording head 762 with respect to the arm 764 of the HGA 766. This rotational motion also results in motion of the transducer 768 in a direction that is substantially perpendicular to the orientation of the data track 770. FIG. 7c illustrates a recording head that has an integrated microactuator positioned between the transducer 772 and the remainder of the recording head 774. By moving with respect to the recording head 774, transducer 772 also can move in a direction that is substantially perpendicular to the orientation of the data track 776.

All of the forgoing small-scale actuators operate in addition to the motion generated by the macroactuators, which produce motion of the entire head gimble assemblies. These examples of small-scale actuators are not limiting of the invention, which can be practiced in combination with a variety of other small-scale actuators positioned between the macroactuator and the transducer.

The small-scale actuator 740 and 760 of FIGS. 7a and 7b, respectively, are similar to existing small-scale actuators that are used in recently developed conventional disk drives. These analogous existing small-scale actuators have been used to adjust the position of transducers over data tracks in disk drives that use only a single recording head at a time to perform read or write operations. Those of skill in the art, upon learning of the invention disclosed herein, will understand how to adapt existing small-scale actuators for use with the invention.

The microactuator of FIG. 7c is a novel small-scale actuator that is similar to the micropositioners disclosed in U.S. patent application Ser. No. 10/342,920, entitled "Integrated Recording Head Micro Positioner for Magnetic Storage Devices," which was filed on Jan. 13, 2003 and is incorporated herein by reference. In addition, the methods of the invention can be practiced using disk drives that are similar to the disk drives disclosed in U.S. patent application Ser. No. 10/342,615, entitled "High Sustained Data Rate Storage Devices Having Microactuator," which was filed on Jan. 13, 2003 and is also incorporated herein by reference.

The microactuators operate on a portion of the HGA that has less mass or a lower moment of inertia than the entire assembly that is moved by the macroactuator. Thus, because the microactuator moves less than the entire HGA, the microactuator is capable of positioning the transducer with greater accuracy and precision than the macroactuator and with better response and settling times. The use of microactuators allows the disk drive actuation system to position each recording head independently to a certain extent. By placing the microactuators at a near center position during the initial servo writing process, the microactuators can thereafter provide additional off-track motion in the range up to about one micron in either direction from the center position, depending upon the nature of the microactuator, in addition to the motion produced by the macroactuators.

Typical track pitches are about 0.3 microns or smaller in existing high-performance disk drives and are expected to continue to decrease in size. The motion produced by the microactuators can therefore be used to independently position each head during operation and to cause each head to stay on the disk track, within a limited range of about five to ten tracks, again depending upon the nature of the microactuator and the track pitch. The microactuators can be used in this manner to perform servo writing techniques within a disk drive having either a single or stacked disk architecture, such as the disk architecture illustrated in FIG. 4.

Figure 1:
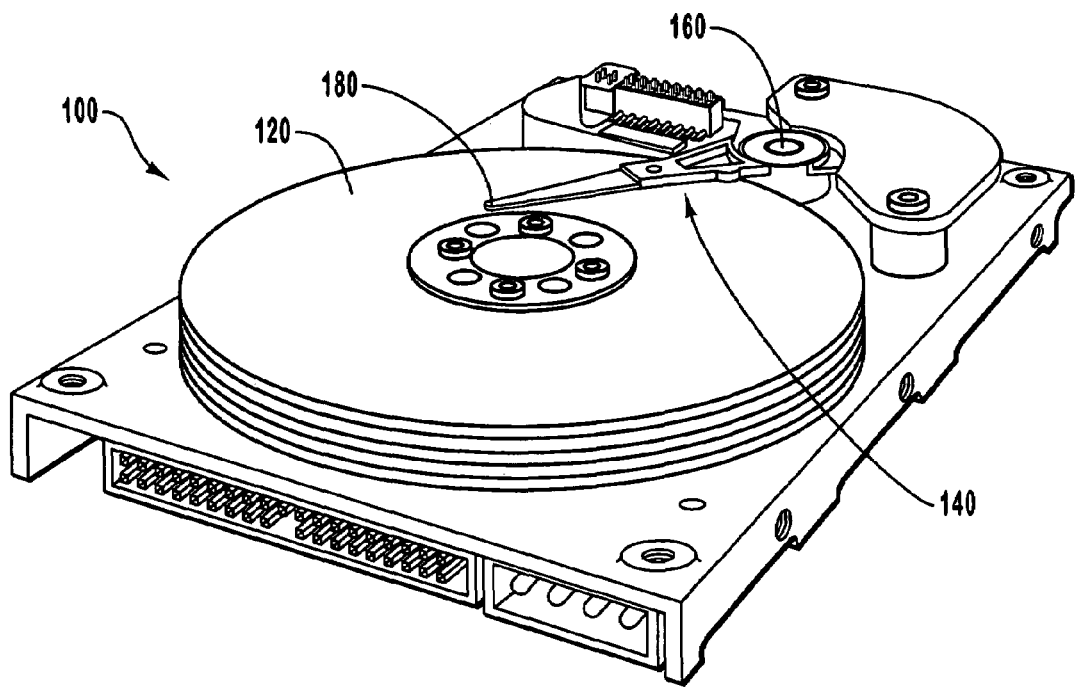
FIG. 1 illustrates a top view of a conventional disk drive and head gimble assembly.
Figure 2:
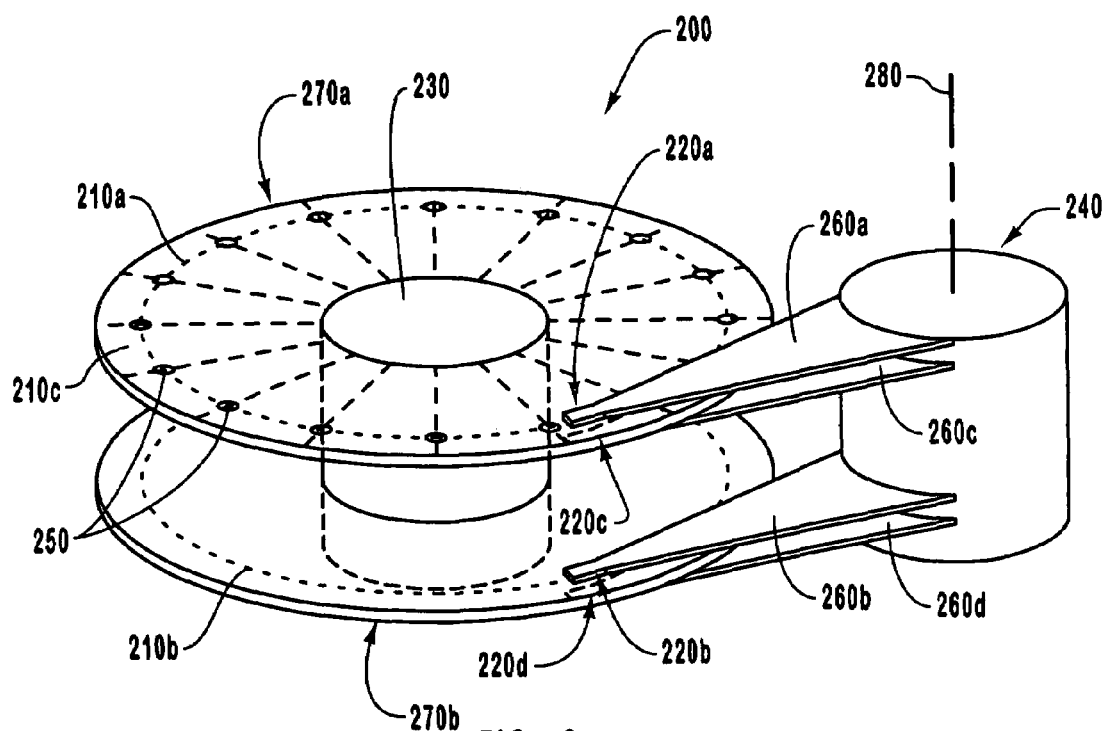
FIG. 2 illustrates a disk stack, with dual heads for each disk, data storage device.
Figure 3:
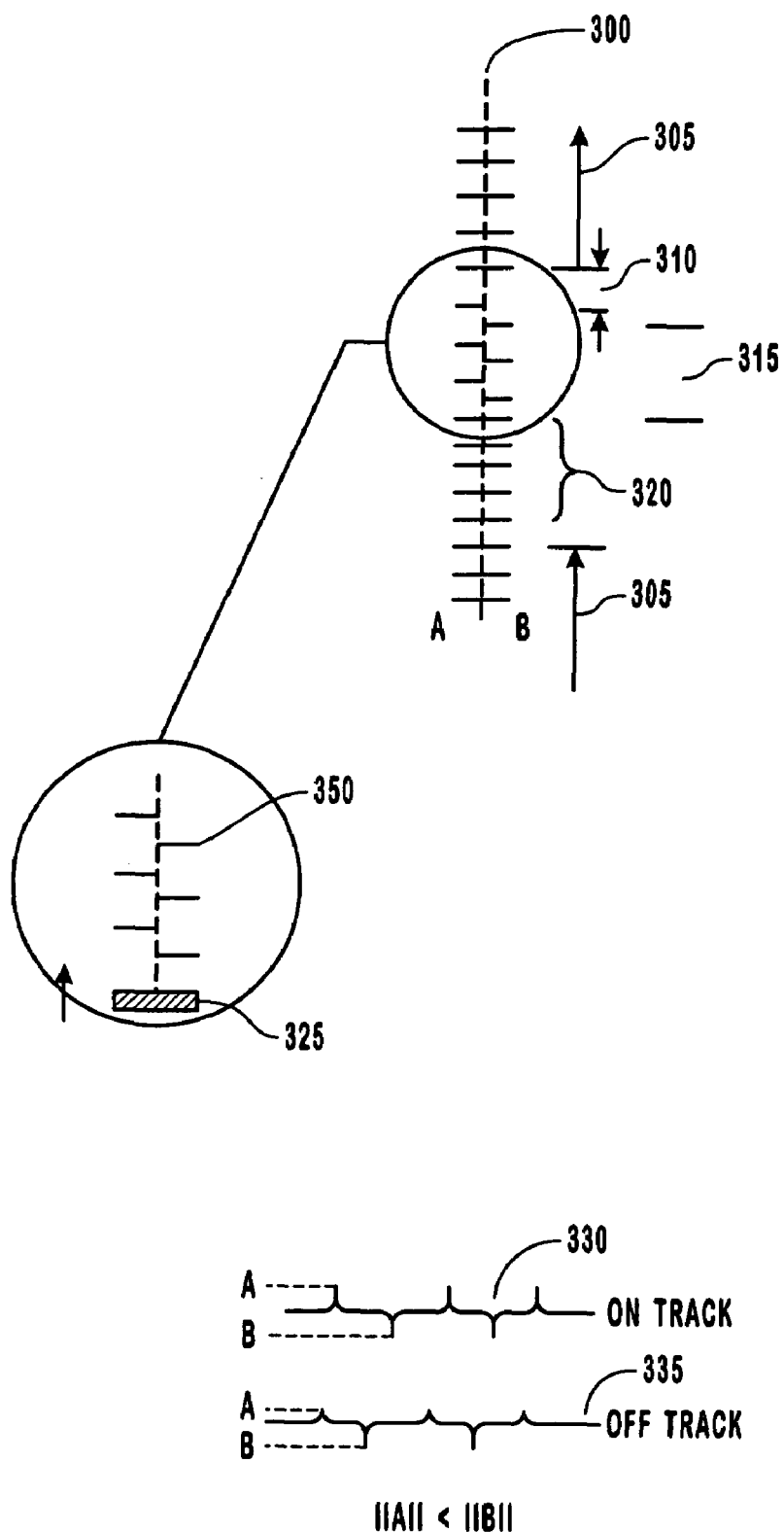
FIG. 3 illustrates an exploited view of data and servo wedge half bits within a data track.
Figure 4:
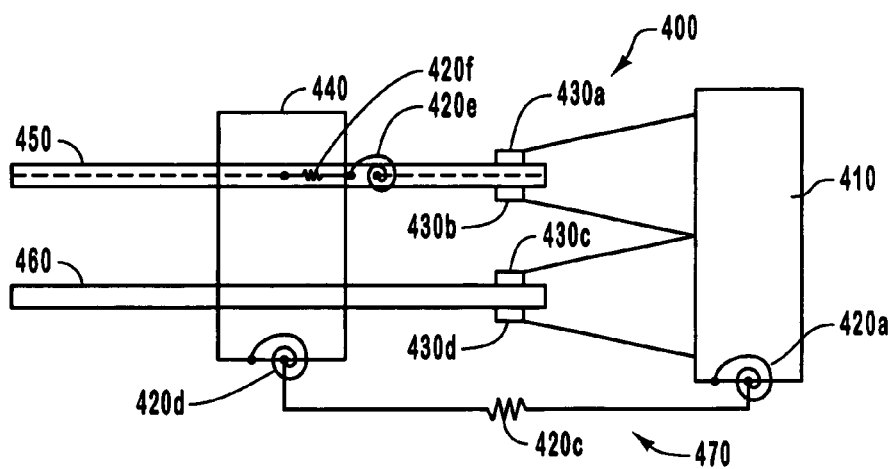
FIG. 4 illustrates a simplified disk drive model that shows the motions associated with various components within a dual disk drive in accordance with example embodiments.

FIG. 4 is a simplified model of a disk drive, showing a spindle motor 440, base 470, actuator post 410, disks 450, 460, and recording heads 430a, 430b, 430c, 430d. The largest contributors to respective head movements during servo writing are identified by rotational spring 420d, base spring 420c, rotational spring 420a, motor spring 420f, and rotational spring 420e. Each spring 420a–f has an associated frequency and stiffness. The frequencies and modes associated with the spring elements 420a–f are more complex with each distributed mass system, and are therefore used here for illustration purposes only and are not meant to limit or otherwise narrow the scope of the present invention.

As will be described in greater detail below, each movement 420a–f associated with disk drive 400 is effectively coupled as they move inward or outward on a written track with the exception of media deflections, which cause stretching and contracting of opposite surfaces causing opposite off-track motions. In other words, modes related to the motor 440 and base excitations, e.g., 420c, are the same for the top portion of the disks 450,460 as well as the bottom portion, whereas modes related to disk flutter and other disk vibrations are in an opposite motion on opposite sides of the disk.

Figure 5:
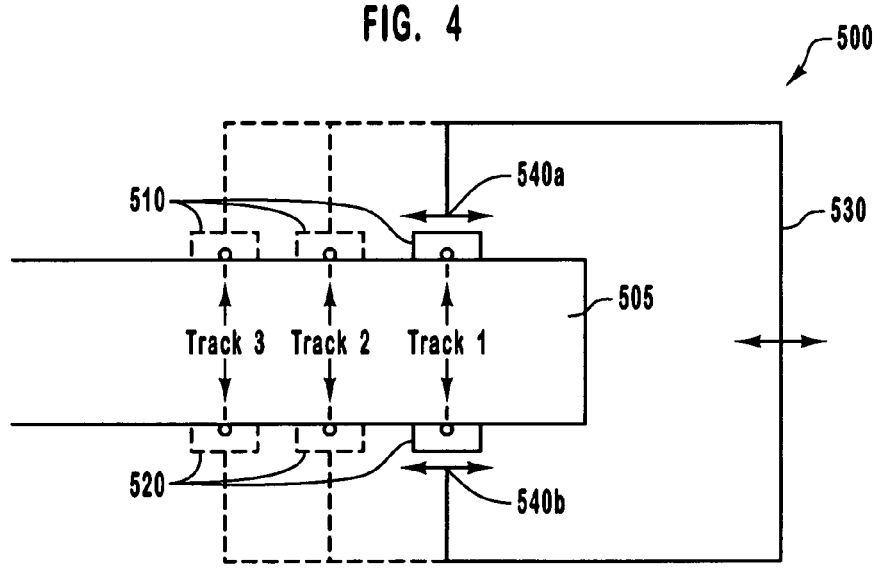
FIG. 5 illustrates track-track writing sequencing in accordance with example embodiments.

The following is an illustration of steps and/or acts associated with methods of writing servo information in a disk drive that greatly reduce the cost and complexity of the servo writing process. Although the process may be described or claimed in a particular order, the present invention is not necessarily limited to any particular ordering or combination of acts and/or steps. Referring to FIG. 5, a track-track writing sequence is illustrated that uses microactuators 540a, 540b and the ability to read and write in parallel on multiple surfaces. After disk drive 500 is fully assembled, i.e., when the drive 500 is fully closed, the drive 500 can be placed onto a mechanically stable and acoustically quiet base, and set to run the process described herein below. A simple optical clocking mechanism (not shown) can be used through a transparent window in the drive base as a motor control signal, eliminating the expensive and cumbersome drive servo writing hardware that has been used in conventional disk drive manufacturing processes.

Figure 8:
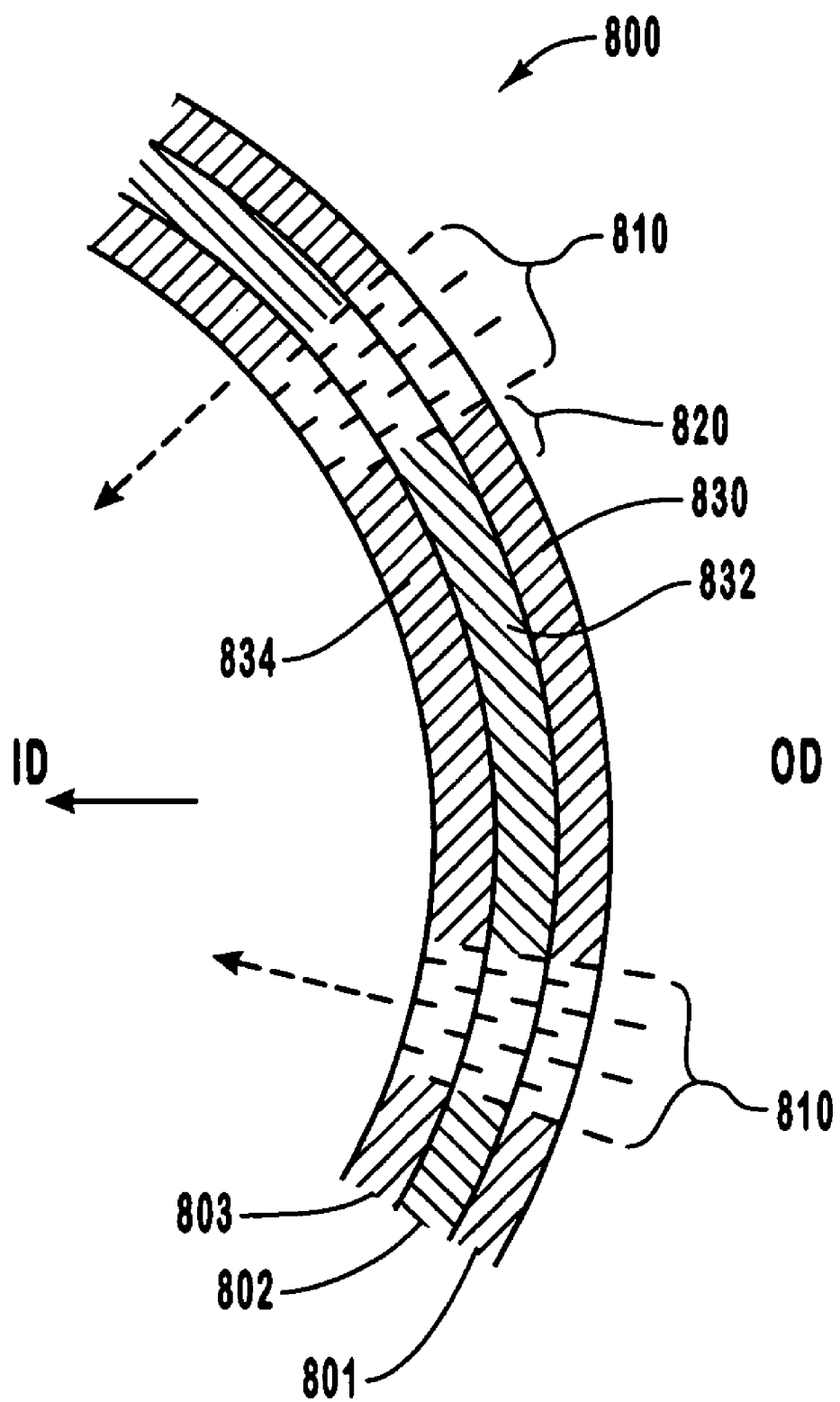
FIG. 8 illustrates track sections showing servo wedges and data patterns that are assist in servo writing in accordance with example embodiments.

Again referring to FIG. 5, with no servo information written on disk 505, a macroactuator 530 is biased against a crash stop, which is a mechanism that limits the motion of an actuator to either an extreme inner or outer diameter and is a fixed reference in most drives, although any reference mechanism for which the macroactuator arm 530 can be biased against can also be used. With the microactuator of a first recording head 510 held constant, a reference track is written on a first surface of disk 505 with a first recording head 510. The information written is grouped into two parts. The first part, as shown in FIG. 8, which is an illustration of track sections in accordance with example embodiments, is an aligned set of servo wedges 810 that are not off-track. These servo half bits are written in accordance with other embodiments described below with regard to consistency checks. The second is a set data pattern 830, 832, 834 for servo assistance in a region to eventually hold recorded data. As further described below, data patterns 830, 832, 834 within tracks 801, 802, and 803, respectively, are out of phase with adjacent tracks, i.e., data pattern 830 is out of phase with data pattern 832 and in phase with data pattern 834. In addition, the data patterns 830, 832, 834 provide higher frequency corrections to the servo track as they progress inward.

Next, assuming the macroactuator is biased against the outer crash stop, the first recording head 510 is micro-actuated 540a toward the outer diameter by a distance defined as when the amplitude of the recorded data track is one half of the original amplitude. An inverse set of bits is written with timing such that the outer portion of the servo wedges 810 is erased, leaving only the half wedge in the track (as shown in the outer diameter track in FIG. 8).

With macroactuator 530 still biased against an outer diameter crash stop, and while holding the microactuator 430a of the first recording head 510 constant, a feedback can be applied from recording head 510 to microactuator 540b for the second recording head 520. The set data pattern 830 can be used to generate a position error signal (PES) that will compensate for disk drive motions such as thermal motion, drive induced vibration, spindle bearing runout, disk vibration/flutter, actuator windage, etc. The result is a similar servo and set data pattern track located on the bottom side of disk 505 in the first track 801 position as that on the top side of disk 505. The motions associated with the disk drive, as described above with regard to FIG. 4, can be compensated for by splitting the motions into separate frequencies and applying additive and subtractive factors to each in predicting the opposite side head motion.

Figure 6:
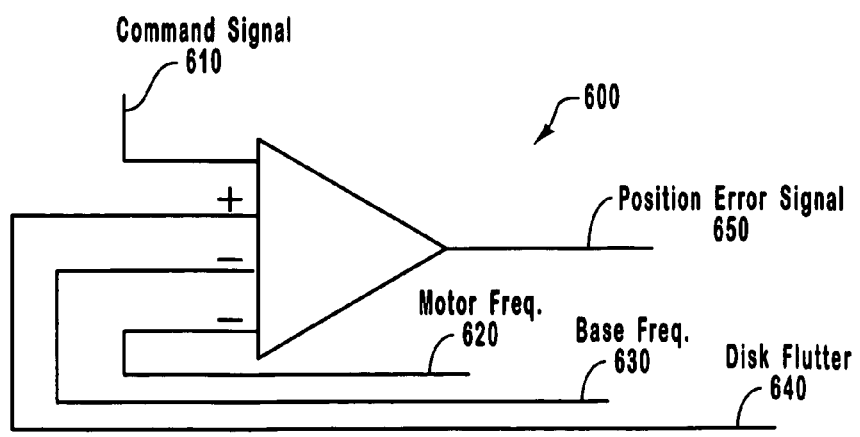
FIG. 6 illustrates a position error signal generator that compensates for the motions within the disk's drive in accordance with example embodiments.

FIG. 6 illustrates an example of how compensation can be made for the motions associated with the disk drive. As described above, when writing to the bottom side of disk 505 while applying feed back from a top data track pattern, the motor frequency 620 and base frequency 630 (determined by measuring or modeling particular excitation frequencies) may be subtracted from the position error signal 650, forcing microactuator 540b to move opposite to the determined motion to maintain a fixed position with respect to the disk. Modes related to disk flutter 640, however, are added to the PES 650, forcing microactuator 540b to follow the disk motion as it is additive. Of course, when multiple disks are used within a stack, other PES solutions may be used for compensating for disk drive motions. For example, for disk surfaces that are oriented in the same direction, e.g., the tops of all disks, the motor and base frequency 620, 630 may be additive, rather than subtractive.

Similar to the process described above for creating the first set of half bits servo wedges, the second recording head 520 may now be micro-actuated 540b towards the outer diameter by a distance defined as when the amplitude of the recorded data is one half of the original amplitude. An inverse set of bits are written with timing such that the outer portion of the servo wedges are erased, leaving only the one half wedge in the track.

While still biasing the macroactuator 530 against the crash stop, and holding the microactuator 540b constant, a feedback can be applied from the second recording head 520 to the first microactuator 540a in accordance with the position error signal represented in FIG. 6, a set data track pattern is written in a second track position (track 802 in FIG. 8) the first recording head 510 and aligned servo markings in the servo area 832. Similar to the process described above, while the macroactuator is still biased against the crash stop, and holding the microactuator 540a of the first recording head 510 constant on the second track 802, applying feedback from the first recording head 510 to the macroactuator 540b and writing a set data track pattern to the second track 802 on the bottom of the disk 505 in accordance with a PES generator. This serves to write a data track pattern that is substantially similar to the data track pattern written on the top surface of disk 505. In other words, the second tracks 802 on both the top and bottom sides of the disk 505 substantially mirror one another.

The macroactuator 530 can now be moved off the crash stop, and the second recording head 520 may be positioned over the second track 802 and used for servoing macroactuator 530. The second microactuator 540b of the second recording head 520 is fixed, only servoing with macroactuator 530. Using the first recording head 510, a third track 803 may be written on the top surface of disk 505 by applying feedback from recording head 520 using the position error signal 600 in FIG. 6, which is now the higher frequency corrections to the servo track and offset from the second track 802. That is, the third track 803 is in phase with the first track 801, which are out of phase with the second track 802, as shown in FIG. 8 where the data patterns 830 and 834 are out of phase with data pattern 832 in tracks 801, 803, and 802, respectively. This process is then repeated for the third track 803, under the second recording head 520, and so forth.

After each track write, two checks may be used to ensure consistency. The first test is a half gap read test that is measured, where the heads are positioned intermittently over the two tracks and the signal is measured for absolute amplitude. If it is below a certain value, this indicates either track encroachment or track separation, and a rewrite may be required. During this intermediate track re-pass, the inverse polarity to the servo wedges may also be written, creating the desired half-width bits in the servo wedge area shown in FIG. 8 as area 810. In particular, the recording head will be position in a radial direction to an intermediate track position opposite the macro reference track. The distance is defined as when the amplitude of the recorded data track is one half of the original amplitude. An inverse set of bits can then be written with timing such that the half wedge servo bits, as shown in area 810, are created.

The above cycle repeats for each track until the entire surfaces are fully written. A final read pass test may be also be made along the track to verify the servo wedges and the alignment of the data tracks. After writing all the data tracks in accordance with the process described above, the signals, with proper frequency splitting and summations, can be compared with signals from opposite heads to ensure consistency in servo track linearity. Limits may then be imposed on the maximum out-of-phase movement each microactuator can experience, or any degradations on the servo wedges.

Once this process is complete, the fixed data within the servo marks 830, 832, 834 can be left in place or erased, as it is no longer needed. For multi-disk drives, these operations can be repeated in parallel, for however many disks are in the pack. During drive operation, the half servo marks are used similar to the current servo wedges by monitoring output and normalizing as previously discussed.

Recording media in disk drives commonly include random defects that prevent data from being written or read. Such defects are typically wider than the actuation length but generally do not extend more than one sector in length. In addition to preventing ordinary data from being written, such defects also can prevent the placement of servo information or other reference data in certain locations of the recording medium. As media defects are identified, the recording heads can be caused to skip or coast through the defective regions without reading reference information or writing servo information. While such gaps in the servo writing process can cause errors to be introduced, the consistency check processes disclosed herein can identify any such errors and prevent errors from propagating to adjacent regions of the recording medium.

As noted herein, the methods of writing servo information can be self-contained and implemented without the use of external servo writing machines. Conventional disk drive manufacturing and testing methods often include a media certification process used to identify and map media defects. In such conventional media certification processes, the position of the defects can be recorded in a table and later used during operation of the disk drive to avoid writing data to bad sectors on the recording medium. This process has typically performed in addition to the conventional servo writing process performed using an external servo writing machine. The methods of the invention can be implemented by combining them with the media certification process. For example, during media certification, the microactuators of the recording heads can be used as described herein to write the servo information to the disk. Combining these two processes further reduces testing costs without requiring the use of external servo writing machines.

The recording surfaces of conventional disk drives with multiple recording heads have track pitches and data density capacities that are substantially constant or identical between disks. However, there is some unavoidable variation in the width of data tracks that are generated using different recording heads, including variation between recording heads within a single disk drive. In conventional disk drives, this variation has little importance on the disk drive operation and data density. However, the microactuators and the ability to independently control the position of the recording heads as described herein can be used, in embodiments of the invention, to decrease the track pitch and increase data densities on some recording surfaces.

This can be performed by using the microactuators to measure the actual width of data tracks created by each of the recording heads in the disk drive stack. The actual track pitch can then be selected based on the actual width of the written data tracks, with narrower tracks having smaller pitches. During the servo writing process, the microactuators control the position of the individual tracks based on the track pitch corresponding to the particular recording surface. For example, surfaces that are to have smaller pitches occasionally receive two tracks per set of rotational passes in the servo writing process, rather than just one. When this technique is employed, the tracks in one recording surface are generally not precisely aligned with the tracks on the other surfaces. Otherwise, the servo writing processes used in this embodiment can be substantially similar to those described herein. When the disk drive is in operation, the microactuators are used to enable each recording head to be positioned over its corresponding tracks despite the fact that the tracks of different surfaces are not aligned.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for writing servo data onto one or more surfaces of one or more disks within a disk drive without using a servo writing machine, comprising:

writing a reference track including first servo data on a first disk surface using a first recording head of the disk drive, the reference track further including a first data set pattern used in writing subsequent servo data in the disk drive;

using a macroactuator that is capable of adjusting the position of both the first recording head and a second recording head of the disk drive, tracking the reference track with the first recording head; and while the first recording head tracks the reference track, using a microactuator of the second recording head to:
radially displace the second recording head from the first recording head and the reference track; and
write second servo data and a second data set pattern on a second disk surface, the second data set pattern used in writing subsequent servo data on a subsequent track in the disk drive.

2. The method of claim 1, further comprising:

generating a position error signal from a feedback signal obtained by the first recording head from the reference track; and using the position error signal to control the microactuator of the second recording head while writing the second servo data and the second data pattern on the second disk surface.

3. The method of claim 1, further comprising after writing the second servo data on the second disk surface:
using the macroactuator, tracking a reference track on the second disk surface with the second recording head; and
while the second recording head tracks the reference track on the second disk surface, using a microactuator of the first recording head to:
radially displace the first recording head from the second recording head and the reference track on the second disk surface; and
write servo data on the first disk surface.

4. The method of claim 3, further comprising, until all servo data is written, successively
using the microactuator of the first recording head to write other servo data on the first disk surface while the second recording head tracks other reference tracks on the second disk surface; and
using the microactuator on the second recording head to write other servo data on the second disk surface while the first recording head tracks other reference tracks on the first disk surface.

5. The method of claim 1, wherein tracking the reference track with the first recording head comprises generating a position error signal that is used by the microactuator of the second recording head to radially displace the second recording head and write the second servo data on the second disk surface.

6. The method of claim 5, wherein the position error signal is inverted and summed to compensate for disk flutter.

7. The method of 1, wherein writing the second servo data to the second disk surface comprises writing additional data set patterns between servo wedges, wherein the additional data set patterns are out-of-phase with respect to adjacent tracks and are used for position control during servo writing.

8. The method of claim 7, wherein:
the data patterns provide a feedback signal for generating a position error signal that is used to control the microactuator of the second recording head; and
the second recording head is radially displaced and the servo data is written to the second disk surface such that the position of servo data on the first disk surface and on the second disk surface is substantially similar.

9. The method of claim 7, wherein writing the servo data to the second disk surface further comprises using the microactuator of the second recording head to position the recording head over the intermediate tracks and for erasing a portion of the servo wedges to obtain half-bit servo wedges.

10. The method of claim 9, wherein erasing a portion of the servo wedges comprises writing an inverse polarity of the servo wedges at a half-track position.

11. The method of claim 9, further comprising, while erasing a portion of the servo wedges, performing a consistency check by detecting any signal interrupts or signal overlaps at the second recording head.

12. The method of claim 1, after all servo data has been written performing a consistency check by:
testing that servo data on the first disk surface and servo data on the second disk surface is substantially similar by positioning the first and second recording heads over intermediate tracks such that only half of the first and second recording heads are positioned over corresponding tracks; and
measuring and comparing the amplitude of the two corresponding tracks to determine if there is track encroachment or track separation.

13. The method of claim 1, wherein the servo data is written at a disk speed that is less than an operational disk speed of the disk drive.

14. The method of claim 1, wherein the servo data is written during a process of media certification performed on the disk surfaces.

15. A method for writing servo data onto disk surfaces in a disk drive without using a servo writing machine, comprising:
biasing multiple recording heads of the disk drive at a first reference position;
positioning a first recording head to follow a first reference track on a surface of a first disk;
while the first recording head follows the first reference track, using microactuators included in one or more other recording heads to independently move the one or more other recording heads in a radial direction to a position that is offset from the first reference track;
writing servo data at the position on one or more disk surfaces using the one or more other recording; and
after writing all servo data on the disk surfaces, performing a consistency check by positioning at least one of the recording heads intermittently over two tracks to identify track encroachment or track separation.

16. The method of claim 15, wherein data within the first reference track is written by the first recording head.

17. The method of claim 16, wherein the servo data comprises servo wedges and data patterns, the servo wedges being used for ensuring that a recording head follows a particular track when the disk drive is in operation and the data patterns used for servoing assistance when writing servo data within subsequent data tracks.

18. The method of claim 17, wherein the data patterns are between the servo wedges and out of phase with data patterns within adjacent tracks, and wherein the data patterns provide a feedback signal for generating a position error signal.

19. The method of claim 18, wherein the position error signal defines one or more motions within the disk drive, and wherein the position error signal provides feedback to the microactuators when moving the one or more other recording heads to said position.

20. The method of claim 19, wherein the one or more motions are associated with frequencies from at least one of a spindle motor, base actuator post, a disk in the disk drive and a recording head.

21. The method of claim 20, wherein the frequencies from the disk includes disk flutter or disk vibration.

22. The method of claim 15, wherein the multiple recording heads are biased at the first reference position using a macroactuator arm, and wherein the first reference position is controlled by a crash stop.

23. The method of claim 22, wherein the crash stop limits the motion of the macroactuator arm to an extreme outer diameter of the disk surfaces.

24. The method of claim 15, wherein at least a part of the servo data at the position is later used as feedback to control the positioning of the first recording head to write servo data on a disk surface associated with the first recording head.

25. The method of claim 15, wherein the servo data at said position includes servo wedges used for computing an error signal for macroactuator and microactuator tracking when the disk drive is in operation, and wherein the servo wedges are converted into half bits by offsetting the multiple recording heads by a half track position and writing an inverse polarity of the servo wedges.

26. In a disk drive that has multiple recording heads for reading and writing data on disk surfaces of one or more disks, a method for writing servo data on the different disk surfaces without requiring a servo writing machine or clean room conditions, wherein at least a portion of the servo data is used in fine track positioning the multiple recording heads when the disk drive is in operation the method comprising:

moving a macroactuator assembly that controls macro positioning for multiple recording heads to a first reference position;

while the macroactuator assembly remains at the first reference position writing a first reference track on a first disk surface using a first recording head the first reference track including servo data and a data set pattern;

centering the first recording head on the first reference track and, while following the first reference track by the first recording head, applying feedback from the first recording head to a microactuator in each of one or more other recording heads from the multiple recording heads, wherein the feedback includes a position error signal generated at least from the data set pattern;

in response to the feedback, using the microactuator in each of the one or more other recording heads to independently move the one or more other recording heads in a radial direction to write servo data on one or more disk surfaces associated with the one or more other recording heads.

27. The method of claim 26, wherein the servo data on the disk surfaces comprises servo wedges and data patterns, the servo wedges being used for ensuring that a recording head follows a particular track when the disk drive is in operation and the data patterns being used for servoing assistance when writing servo data within subsequent data tracks.

28. The method of claim 27, wherein the data patterns are positioned between the servo wedges and are out-of-phase with data patterns within adjacent tracks, and wherein the data patterns provide a feedback signal for generating the position error signal.

29. The method of claim 28, wherein the position error signal is responsive to one or more motions within the disk drive, and wherein the position error signal is used to control the microactuators of the one or more other recording heads when writing the servo data.

30. The method of claim 29, wherein the one or more motions are associated with frequencies from at least one of a spindle motor, base actuator post, a disk in the disk drive and a recording head.

31. The method of claim 26, wherein the servo data includes servo wedges used for computing an error signal for macroactuator and microactuator tracking when the disk drive is in operation, and wherein the servo wedges are converted into half bits by offsetting the multiple recording heads by a half track position and writing an inverse polarity of the servo wedges.

32. In a closed and assembled disk drive with one or more disks used to store data, a method of writing servo wedges onto at least two surfaces of one or more disks within the disk drive without the use of a servo writing machine, the servo wedges used in fine track positioning when the disk drive is in operation, the method comprising:

writing servo data and a first data set pattern in a first track on a first side of the disk;

using at least a part of the servo data and the first data set pattern as feedback to generate a position error signal that defines the motions associated with one or more components within the disk drive;

based on the position error signal, writing servo data and a second data set pattern in a first track on a second side of the disk such that the first data set pattern associated with the servo data in the first track on the first side of the disk is substantially similar to the second data set pattern associated with the servo data in the first track on the second side of the disk.

33. The method of claim 32, wherein the servo data in the first track on the first and second sides of the disk include servo wedges used for micro and macro positioning of the respective head over the first tracks when the disk drive is in operation, and the first and second data patterns for servoing assistance when writing servo data within subsequent tracks.

34. The method of claim 33, wherein data patterns in adjacent tracks are between the servo wedges are out of phase with adjacent tracks, and wherein the data patterns provide the feedback for generating the positioning error signal.

35. The method of claim 34, wherein the position error signal controls the micro positioning of a recording head such that the first and second tracks are substantially similar in positioning on respective sides of the disk.

36. The method of claim 32, wherein the one or more motions are associated with frequencies from at least one of a spindle motor, base, actuator post, one or more disks or one or more heads.

37. The method of claim 36, wherein the frequencies from the one or more disks include at least one of disk flutter or disk vibrations, which are added to the position error signal and the frequencies associated with at least one of a spindle motor, base, actuator post or one or more heads are subtracted from the position error signal for predicting the opposite side head motion of the second head.

38. The method of claim 32, wherein the writing of servo data in the first track on the second side of the disk is controlled by a microactuator that moves a recording head in a radial direction.

39. The method of claim 32, further comprising:

generating a second position error signal from a second feedback signal of at least a portion of the servo data in the first track on the second side of the disk for use in positioning a first recording head; and based on the second position error signal, controlling a micro positioning of the first recording head when writing a second set of servo data onto a second track on the first side of the disk.

40. The method of claim 32, wherein the servo data in the first tracks on the first and second sides of the disk include servo wedges used for computing an error signal for macro and microactuator tracking when the disk drive is in operation, and wherein the servo wedges are converted into half bits by offsetting first and second recording heads by a half track position relative to the first tracks of the first and second sides of the disk and writing an inverse polarity of the servo wedges initially written with the first and second reference data.

41. The method of claim 32, further comprising:

testing that the first tracks are substantially similar by positioning first and second recording heads over intermediate tracks such that only half of the first and second recording heads are positioned over the first tracks on the first and second sides, respectively; and measuring and comparing the amplitude of the first tracks to determine if there is track encroachment or track separation.

42. The method of claim 41, wherein, during the testing of the first tracks, the servo wedges are converted into half bits by writing an inverse polarity of the servo wedges.

43. A method for writing servo data onto one or more surfaces of one or more disks within a disk drive to obtain different pitch widths on different surfaces:

measuring actual track widths generated by different recording heads in the disk drive, wherein at least some of the different recording heads generate different actual track widths;

based on the actual track widths, selecting track pitches for each of the surfaces, wherein first track pitches of a first surface of the one or more disks within the disk drive are different from second track pitches of a second surface of the one or more disks within the disk drive; and writing on the surfaces servo data defining the selected track pitches using microactuators associated with the recording heads.

44. The method of claim 43, wherein the servo data is written without using an external servo writing machine.

45. The method of claim 43, wherein some of the surfaces have a greater data density than other surfaces.

46. The method of claim 43, wherein writing servo information comprises:

writing a reference track on a first disk surface using a first recording head of the disk drive using a macroactuator that is capable of adjusting the position of both the first recording head and a second recording head of the disk drive, tracking the reference track with the first recording head; and while the first recording head tracks the reference track, using a microactuator of the second recording head to:
radially displace the second recording head from the first recording head and the reference track; and
write the servo data on a second disk surface.

47. The method of claim 43, wherein writing servo data comprises using a first recording head to write the servo data for a specified region of the first surface and using a second recording head to write the servo data for a specified region of the second surface.

48. The method of claim 47, wherein:

the servo data is written using the first recording head and the second recording head in alternating sets of rotational passes; and some of the sets of rotational passes result in the writing of servo data that defines only one track and some of the sets of rotational passes result in the writing of two tracks.

* * * * *

UNITED STATES PATENT AND TRADEMARK OFFICE
CERTIFICATE OF CORRECTION

PATENT NO. : 7,218,471 B2  Page 1 of 1
APPLICATION NO. : 10/728561
DATED : May 15, 2007
INVENTOR(S) : Dallas W. Meyer It is certified that error appears in the above-identified patent and that said Letters Patent is hereby corrected as shown below:

Column 3
Line 20, change "Theses" to --These--

Column 4
Line 41, change "g" to --recording--
Line 44, before "assist" insert --used to--
Line 67, change "traducers" to --transducers--

Column 7
Line 59, change "430a" to --540a--

Column 8
Line 44, change "540b" to --530--
Line 59, change "600" to --650--

Column 9
Line 11, change "position" to --positioned--
Line 59, after "typically" insert --been--

Column 12 Claim 15
Line 26, after "recording" insert --heads--

Signed and Sealed this

Eighteenth Day of March, 2008

JON W. DUDAS
*Director of the United States Patent and Trademark Office*